Feb. 7, 1956     L. A. MALLORY     2,733,534
FISHING LURE
Filed Dec. 13, 1954
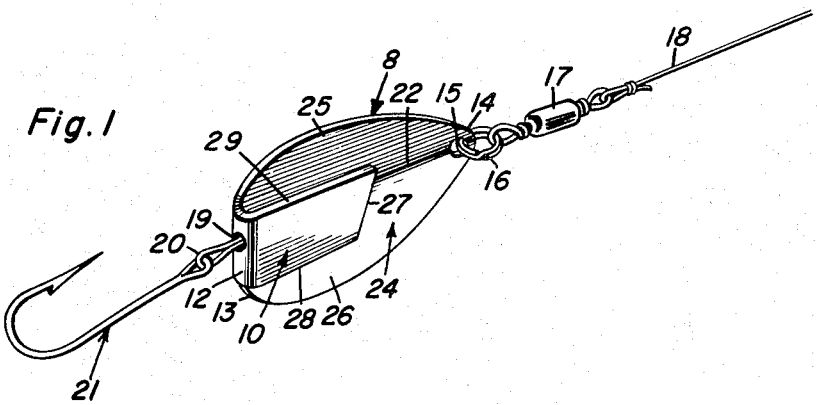
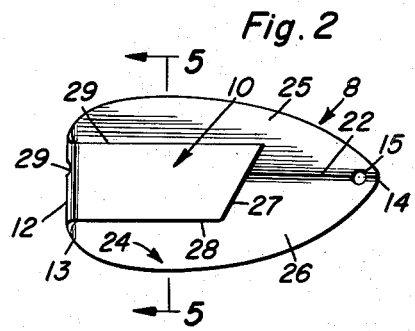
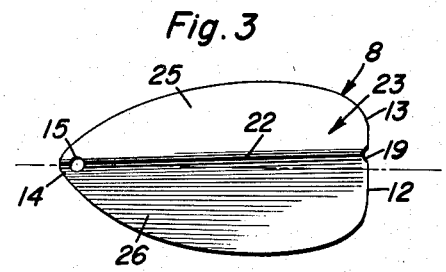
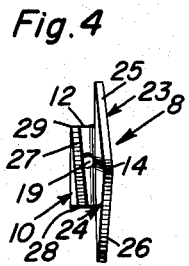
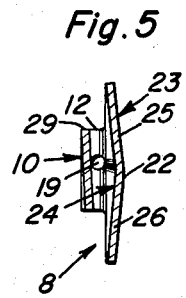
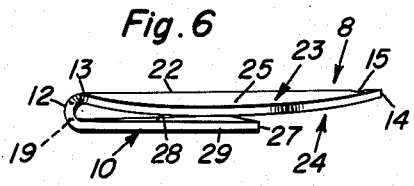
Lester A. Mallory
INVENTOR.

United States Patent Office 2,733,534
Patented Feb. 7, 1956

2,733,534

FISHING LURE

Lester A. Mallory, San Francisco, Calif.

Application December 13, 1954, Serial No. 474,817

2 Claims. (Cl. 43—42.5)

The present invention relates to a fishing lure and more specifically, to a trolling spoon which is characterized by a shallow ovate body.

An object of the invention is to provide a trolling spoon which animates by rocking from side to side as it rides along through the water and which tends to resist complete twirling and spinning about a horizontal axis.

Another object of the invention is to provide an ovate-shaped trolling spoon with a relatively narrow tang which is connected by a return bend to the trailing or rearward end of the spoon and which underlies what may be called the concave side of the spood and functions as an impeller.

It follows that other objects, features and advantages will become more readily apparent from the specification and subjoined claims.

In the drawings, wherein like numerals are employed to designate like parts throughout the views:

Figure 1 is a perspective view of a trolling spoon constructed in accordance with the principles of the present invention and showing the manner in which it is readied for use;

Figure 2 is a bottom plan view of the same with the line and fishhook removed;

Figure 3 is a top plan view of the structure seen in Figure 2;

Figure 4 is an end view of Figure 2, observing the same in a direction from right to left;

Figure 5 is a cross-section on the plane of the line 5—5 of Figure 2, looking in the direction of the arrows; and Figure 6 is an edge elevation.

Referring now to the drawings, the plate or blade which is broadly referred to as the spoon proper is denoted by the numeral 8. This is constructed of appropriate shiny non-corrodible metal and is either ovoid or ovate in plan, and therefore resembles, generally speaking, the "bowl" of a tablespoon. The integrated complemental part is an impeller, and this is denoted generally by the numeral 10. This takes the form of a relatively narrow rectangular blade or tang, and it is connected by a curvate or return bend 12 with the intermediate portion of the trailing end 13 of the plate or spoon proper. The opposite or leading end, the narrower end, is denoted by the numeral 14. The spoon is provided at this end with an opening 15 accommodating a ring 16 provided with a swivel 17 to which the fishing line 18 is connected. The stated bend 12 is provided with an off-center hole 19 into which an appropriate cotter key or equivalent fastener 20 is fitted in a manner to accommodate the conventional fishhook 21. The spoon 8 is V-shaped in cross-section but exceptionally shallow. The vertex or ridge of the V is linearly straight and denoted by the numeral 22. Before discussing this detail further, it will be noticed that the top or convex side of the spoon is denoted at 23, while the concave side is denoted at 24. Returning to the ridge, it will be seen, as best shown in Figures 2 and 3, that the leading end is coincident with the center line, that is, the longitudinal axis of the spoon, and it then slants gradually until it takes an off-center position. In the specimen used as a guide, the off-center measurement was one-thirty-second of an inch, which is approximately that illustrated in Figure 3, for example. It follows that the spoon is divided into substantially semi-ovate components or wings as they are sometimes referred to, and these are denoted for convenience by the numerals 25 and 26. The right hand portion of the wing 26 in Figure 3 is slightly wider and therefore slightly heavier than the corresponding part of the wing 25. It will also be observed that the tang is peculiarly fashioned. That is to say, the tang is of a length less than the length of the over-all spoon and the forward or leading transverse end is obliquely cut across, as at 27. The tang is also twisted axially so that the shorter lengthwise edge 28 slants or cants toward the concave side of the spoon, as perhaps best shown in Figures 4, 5 and 6. That is to say, the edge 28 is closer to the spoon than the edge 29. The slight disparity in the increased width of the wing 26 and the complemental position of the tang causes these features to combine in providing a little extra ballast toward one side of the lengthwise or median longitudinal center, which is sufficient, it has been found, to keep this impeller-equipped spoon from twirling and spinning undesirably. However, the spoon trolls in the desired life-like swimming position and rocks slightly from side to side as it rides along through the water.

Since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A fishing lure comprising a substantially imperforate plate ovate in plan and V-shaped in cross-section and providing convex and concave sides, a fishing line accommodating swivel operatively attached to the leading apical end of said plate, and an elongate tang appreciably narrower than said plate and overlying the concave side of the plate, said tang being of a length less than the length of the plate, rectangular in plan and having its forward transverse end cut obliquely and spaced rearwardly of the leading end of the plate, the rearward end of the said tang having a complemental bend joined to the central portion of the rearward trailing end of said plate, said bend having an off-center hole to accommodate a fastener for a fishhook, said tang being in close proximity to the cooperating surface of the plate from end to end and being twisted axially whereby the shorter lengthwise edge cants toward the concave side and is therefore closer to said side than the longer lengthwise edge.

2. A fishing lure comprising a substantially imperforate plate ovate in plan, a swivel attached to the leading apical end to accommodate a fishing line, an elongate tang spaced from and opposed to one side of said plate, said tang being of a length less than the length of the plate, rectangular in plan and appreciably narrower than said plate, having its forward transverse end cut obliquely and spaced rearwardly of the leading end of the plate, the rearward end of said tang having a complemental bend joined to the central portion of the rearward trailing end of said plate, said bend having an off-center hole to accommodate a fishhook fastener, said plate providing a spoon and said tang functioning as an impeller therefor, said tang being canted so that one lengthwise edge is closer to the cooperating surface of the spoon than the other lengthwise edge, said plate being V-shaped in cross-section, said tang overlying the concave side of said plate, the median longitudinal ridge of said plate, an inherent characteristic of the V-shaped cross-section, being centered and aligned at its forward end with the leading end of said plate and slanting gradually to assume an off-center position at the trailing end of the plate, whereby said plate is divided into semi-ovate components one of which is slightly larger and heavier than the other and whereby the extra ballast afforded thereby and also by the correspondingly offset tang causes the spoon to swim and rock from side to side without spinning axially.

References Cited in the file of this patent

UNITED STATES PATENTS

| | | |
|---|---|---|
| 1,598,958 | Crosby | Sept. 7, 1926 |
| 2,164,415 | Mallett | July 4, 1939 |
| 2,559,042 | Norris | July 3, 1951 |
| 2,567,813 | Hyland | Sept. 11, 1951 |